(12) United States Patent
Corbett et al.

(10) Patent No.: US 7,769,995 B2
(45) Date of Patent: Aug. 3, 2010

(54) SYSTEM AND METHOD FOR PROVIDING SECURE NETWORK ACCESS

(75) Inventors: Christopher J. Corbett, Duvall, WA (US); Scott A. Manchester, Redmond, WA (US); Benjamin E. Nick, Seattle, WA (US); Salim S. AbiEzzi, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1126 days.

(21) Appl. No.: 10/999,555

(22) Filed: Nov. 30, 2004

(65) Prior Publication Data
US 2005/0149757 A1 Jul. 7, 2005

Related U.S. Application Data (60) Provisional application No. 60/592,506, filed on Jul. 30, 2004, provisional application No. 60/534,795, filed on Jan. 7, 2004.

(51) Int. Cl.
*H04L 12/66* (2006.01)
(52) U.S. Cl. .............. 713/153; 726/12; 726/15
(58) Field of Classification Search ........... 713/153, 713/155; 726/15, 12
See application file for complete search history.

(56) References Cited

U.S. PATENT DOCUMENTS

| | | | |
|---|---|---|---|
| 5,933,504 | A | 8/1999 | Vanstone et al. |
| 6,052,720 | A | 4/2000 | Traversat et al. |
| 6,078,667 | A | 6/2000 | Johnson |
| 6,148,354 | A | 11/2000 | Ban et al. |
| 6,178,507 | B1 | 1/2001 | Vanstone |
| 6,195,433 | B1 | 2/2001 | Vanstone et al. |
| 6,449,642 | B2 | 9/2002 | Bourke-Dunphy et al. |
| 6,526,264 | B2 | 2/2003 | Sugar et al. |
| 6,563,928 | B1 | 5/2003 | Vanstone et al. |

(Continued)

FOREIGN PATENT DOCUMENTS

WO   WO-2004/058403 A2   7/2004

(Continued)

OTHER PUBLICATIONS

U.S. Appl. No. 10/806,369, filed Mar. 23, 2004, Manchester et al.

(Continued)

*Primary Examiner*—Ellen Tran
(74) *Attorney, Agent, or Firm*—Marshall, Gerstein & Borun LLP (57) ABSTRACT

Secure network access is provided by connecting a secure network provisioning device to a security authority, acquiring one or more network profiles, configuring one or more network interfaces of the secure network provisioning device with data corresponding to attributes of the acquired network profiles, switching the secure network provisioning device from an acquisition mode to a gateway mode, and connecting the secure network provisioning device to a client device. The secure network provisioning device includes a first set of network communication interfaces requiring configuration blocks to enable access to associated networks, a second set of network communication interfaces free from a requirement for configuration prior to network access, a communication interface gateway module configured to gate network traffic between network communication interfaces and a network profile acquisition module configured to acquire network profiles containing data required to configure the communication interfaces of the first set.

20 Claims, 8 Drawing Sheets

U.S. PATENT DOCUMENTS

| | | |
|---|---|---|
| 6,654,841 B2 | 11/2003 | Lin |
| 6,687,492 B1 | 2/2004 | Sugar et al. |
| 6,700,450 B2 | 3/2004 | Rogers |
| 6,714,605 B2 | 3/2004 | Sugar et al. |
| 6,728,517 B2 | 4/2004 | Sugar et al. |
| 6,785,520 B2 | 8/2004 | Sugar et al. |
| 6,850,735 B2 | 2/2005 | Sugar et al. |
| 2001/0014153 A1 | 8/2001 | Johnson |
| 2002/0053031 A1* | 5/2002 | Bendinelli et al. .......... 713/201 |
| 2002/0090085 A1 | 7/2002 | Vanstone et al. |
| 2002/0152380 A1 | 10/2002 | O'Shea et al. |
| 2002/0152384 A1 | 10/2002 | Shelest et al. |
| 2003/0101247 A1 | 5/2003 | Kumbalimutt et al. |
| 2003/0225971 A1 | 12/2003 | Oishi et al. |
| 2004/0002943 A1 | 1/2004 | Merrill et al. |
| 2004/0010429 A1 | 1/2004 | Vedula et al. |
| 2004/0024875 A1 | 2/2004 | Horvitz et al. |
| 2004/0038592 A1 | 2/2004 | Yang |
| 2005/0102529 A1* | 5/2005 | Buddhikot et al. .......... 713/200 |
| 2005/0193103 A1* | 9/2005 | Drabik ....................... 709/221 |

FOREIGN PATENT DOCUMENTS

| | | |
|---|---|---|
| WO | WO-2005/074227 A2 | 8/2005 |

OTHER PUBLICATIONS

U.S. Appl. No. 10/807,095, filed Mar. 23, 2004, Manchester et al.
U.S. Appl. No. 10/806,331, filed Mar. 23, 2004, Manchester et al.
U.S. Appl. No. 10/806,772, filed Mar. 23, 2004, Freeman et al.
U.S. Appl. No. 10/806,636, filed Mar. 23, 2004, Manchester et al.
U.S. Appl. No. 60/534,795, filed Jan. 7, 2004, Abraham et al.
U.S. Appl. No. 60/592,506, filed Jul. 30, 2004, Corbett et al.
U.S. Appl. No. 10/967,368, filed Oct. 18, 2004, Crosier et al.
Bailie, et al., "The Networked Digital Home," *Soundscapes Info*, (2002) printed Mar. 29, 2004, pp. 1-2, <http://icce.rug.nl/~soundscapes/VOLUME05/LSI_mediacast.html>.
Balfanz, et al., *Talking to Strangers: Authentication in ad hoc Wireless Networks*, In Symposium on Network and Distributed Systems Security, San Diego, California, 2002, printed Mar. 24, 2004, pp. 1-14, <http://citeseer.ist.psu.edu/balfanz02talking.htm>.
Harkins et al., *The Internet Key Exchange (IKE)*, Network Working Group RFC 2409, 1-41pp. (Nov. 1998).
Huang, et al., *Making Computers Disappear: Appliance Data Services*, pp. 1-14, Mobilcom 2001, Rome, Italy (2001).
Kent et al., *IP Authentication Header*, Network Working Group RFC 2402, 1-22 pp., Nov. 1998.
Kent et al., *IP Encapsulating Security Protocol*, Network Working Group RFC 2406, 1-22 pp. (Nov. 1998).
Maitland, *Okapi Unlocks iSCSI*, printed Mar. 24, 2004, pp. 1-9, (2003-2004) <http://www.byteandswitch.com/document.asp?doc_id=19173>.
Nexware Corporation, "Software Solutions: Networked Solutions," Nexwarecorp.com (2001), printed Mar. 29, 2004, pp. 1, <http://www.nexwarecorp.com/products/networked_solutions.htm>.
Rescorla, *Diffie-Hellman Key Agreement Method*, Network Working Group RFC 2631, 1-13 pp. (Jun. 1999).
Schroder, *USB Pen Drives. Large Portable Storage in a Tiny Package*, (Dec. 2003) printed Mar. 24, 2004, pp. 1-9, <http://networking.earthweb.com/nethub/article.php/10950-3291891_1>.
Unknown, *Using Smart Cards With the Sun Ray 1 Enterprise Appliance*, Revision 01, pp. 1-15, Palo Alto, California (Sep. 1999).
Unknown, *Integrating Sun Ray 1 Enterprise Appliances and Microsoft Windows NT*, Sun Microsystems, Inc., pp. 1-19, Palo Alto, California (2000).
Unknown, *Smart Card for Temporary Facilities Security*, Information Methods Incorporated Group, LLC, pp. 1-16, (Jan. 2004).
Unknown, *Sun Ray Overview*, Sun Microsystems, Inc., pp. 1-28, Santa Clara, California (Apr. 2003).
Unknown, *Sun Ray Interoperability Brief*, Sun Microsystems, Inc., pp. 1-14, Santa Clara, California (Aug. 2003).
Unknown, "Sun Ray," *Editor's Choice Communication Solutions*, (Jun. 2004) printed Mar. 26, 2004, pp. 1-8, <http://www.tmcnet.com/comsol/0601/0601|ab2.htm>.
Unknown, "Linksys Instant Wireless USB Network Adapter WUSB11 Network Adapter," *Product Review*, (2004) printed Mar. 24, 2004, pp. 1-4, <http://hardwarecentral.dealtime.com/xPR_Linksys_Instant_Wireless_WUSB11>.
Wakefield, *Wireless Technology and Your Mobile Device*. Microsoft Support WebCast, transcript pp. 1-13, slides pp. 1-60, printed Oct. 31, 2002, <http://support.microsoft.com/default.aspx?acid+%2Fservicedesks%2Fwebcasts%2Fwc103102.asp>.
Ylisaukko-Ojai, et al., *Low Capacity Wireless Home Networks—Cheap and Simple Interconnections between Devices*, pp. 1-20, Version 1.0, Iikk Korhonen,(May 2002).
U.S. Appl. No. 11/060,290, filed Feb. 17, 2005, Madhavan et al.
U.S. Appl. No. 11/096,042, filed Mar. 31, 2004, Gatta et al.
European Search Report for Application No. EP 05 10 7023 dated Nov. 7, 2005.
Introduction to Design, Cisco 800 Fast Step Software Design Guide, XP-002320049.

* cited by examiner

SYSTEM AND METHOD FOR PROVIDING SECURE NETWORK ACCESS

CROSS-REFERENCE TO RELATED PATENT APPLICATIONS

This patent application claims the benefit of U.S. Provisional Patent Application No. 60/534,795, filed Jan. 7, 2004, entitled "CONFIGURING NETWORK SETTINGS USING PORTABLE STORAGE MEDIA," and U.S. Provisional Patent Application No. 60/592,506, filed Jul. 30, 2004, entitled "SYSTEM AND METHOD FOR PROVIDING SECURE NETWORK ACCESS."

FIELD OF THE INVENTION

This invention pertains generally to computer networks and, more particularly, to secure network provisioning.

BACKGROUND OF THE INVENTION

Computer networks and inter-networks have become commonplace as more and more people use them for work and play. Electronic mail, instant messages, streaming audio and video, collaborative forums and interactive games: these are just some examples of the constantly increasing number of computer network applications. With computer networks becoming integrated into everyday life, a demand has arisen for casual and intuitive networking, for example, the ability to access computer network resources without having to depend upon the assistance of a computer networking expert.

However, at the same time, at least one barrier to casual computer networking has arisen for interrelated reasons. As computer networks become integrated into everyday life, increasing amounts of confidential data are passed over and become accessible to those networks. The number of environments where it is appropriate to use insecure computer networks is rapidly diminishing, particularly in light of the popularity of wireless computer networks where the physical points of access are not necessarily obvious. It is common to find sophisticated security mechanisms even in residential networks. Security takes its toll on causal networking by adding addition layers of complication to already complicated network access procedures. Frustration with providing network access can result in security features being disabled or simply an outright access ban.

An example scenario has someone with a laptop or other network-ready device traveling away from home or work and visiting a location with a new network. To avoid elaborate secure network registration procedures, a local may provide their own network access credentials (e.g., username, password, and/or encryption key) to the visitor. This violates good security policy in several ways, for example, the visitor may identify as the local on the network (possibly giving the visitor overly broad network access) and, if efforts are not made to erase them, a copy of the network access credentials remain on the visitor's device. This is particularly problematic if the network charges for access to its resources.

One aspect of the problem with respect to configuration convenience is that the network access credentials are best provided "out-of-band," that is, by some other method than the secure network for which access is sought. Often insecure network service is available before secure network service, but passing network access credentials over an insecure network is a security risk. Another complication is that configuring a device for access to a particular secure network typically requires more than just network access credentials, for example, there may be an entire associated network "profile" that is required by the network-ready device for optimal functionality. An example of such a network profile is a wireless profile as described in the *Wireless Provisioning Service* section of the *Microsoft Developer Network (MSDN®) Library* dated May 2004. The amount of data involved can make configuration, for example, via a phone call to a help desk, cumbersome and error prone.

It is possible that a new kind of network could be designed to overcome these difficulties, however, such a solution would fail to provide secure access to the vast base of existing networks. For maximum compatibility, configuration difficulties should be resolved, as much as possible, within the constraints of existing networking standards. Similarly, an optimal solution should not exclude a broad range of existing network-ready devices, for example by requiring a custom interface, and, in addition, should accommodate any additional layers of auto-configuration functionality, such as "plug-and-play" functionality, possessed by the device. Example details and context with respect to device auto-configuration functionality are described by the *Plug and Play* section of the *Kernel-Mode Driver Architecture Design Guide* in the *Microsoft Developer Network (MSDN®) Library* dated Jun. 14, 2004.

BRIEF SUMMARY OF THE INVENTION

This section presents a simplified summary of some embodiments of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In an embodiment of the invention, providing secure network access includes connecting a secure network provisioning device to a security authority. One or more network profiles may be acquired from the security authority. One or more network interfaces of the secure network provisioning device may be configured with data corresponding to attributes of the acquired network profiles. The secure network provisioning device may be switched from an acquisition mode to a gateway mode. The secure network provisioning device may be connected to a client device. The client device may be provided with access to a secure network associated with each acquired network profile.

In an embodiment of the invention, providing secure network access includes managing one or more network profiles associated with a secure network. Connections may be accepted from the secure network provisioning device when it is in the acquisition mode and the network profiles under management may be provided to the device. Each provided network profile may enable the secure network provisioning device to provide a client device with access to the secure network associated with the network profile when the secure network provisioning device switches to the gateway mode.

In an embodiment of the invention, providing secure network access includes accepting connections from the secure network provisioning device when it is in the gateway mode. In order to access secure networks through the secure network provisioning device, each secure network may require authentication credentials for access. The secure network provisioning device may by configured with the required authentication credentials while in the acquisition mode.

In an embodiment of the invention, the secure network provisioning device includes a first set of network communication interfaces, a second set of network communication interfaces, a communication interface gateway module and a network profile acquisition module. The first set of network communication interfaces may include one or more network communication interfaces requiring a configuration block to enable access to a network associated with the network communication interface. The second set of network communication interfaces differs because it may include one or more network communication interfaces that are free from a requirement for configuration prior to network access. The communication interface gateway module may be configured to gate network traffic between network communication interfaces in the first and second sets. The network profile acquisition module may acquire network profiles from a security authority and provide the configuration blocks required by the communication interfaces of the first set, each configuration block corresponding to one or more of the acquired network profiles.

BRIEF DESCRIPTION OF THE DRAWINGS

While the appended claims set forth the features of the invention with particularity, the invention and its advantages are best understood from the following detailed description taken in conjunction with the accompanying drawings, of which:

DETAILED DESCRIPTION OF THE INVENTION

Prior to proceeding with a description of the various embodiments of the invention, a description of a computer in which the various embodiments of the invention may be practiced is now provided. Although not required, the invention will be described in the general context of computer-executable instructions, such as program modules, being executed by a computer. Generally, programs include routines, objects, components, data structures and the like that perform particular tasks or implement particular abstract data types. The term "program" as used herein may connote a single program module or multiple program modules acting in concert. The terms "computer" and "computing device" as used herein include any device that electronically executes one or more programs, such as personal computers (PCs), hand-held devices, multi-processor systems, microprocessor-based programmable consumer electronics, network PCs, minicomputers, tablet PCs, laptop computers, consumer appliances having a microprocessor or microcontroller, routers, gateways, hubs and the like. The invention may also be employed in distributed computing environments, where tasks are performed by remote processing devices that are linked through a communications network. In a distributed computing environment, programs may be located in both local and remote memory storage devices.

Figure 1:
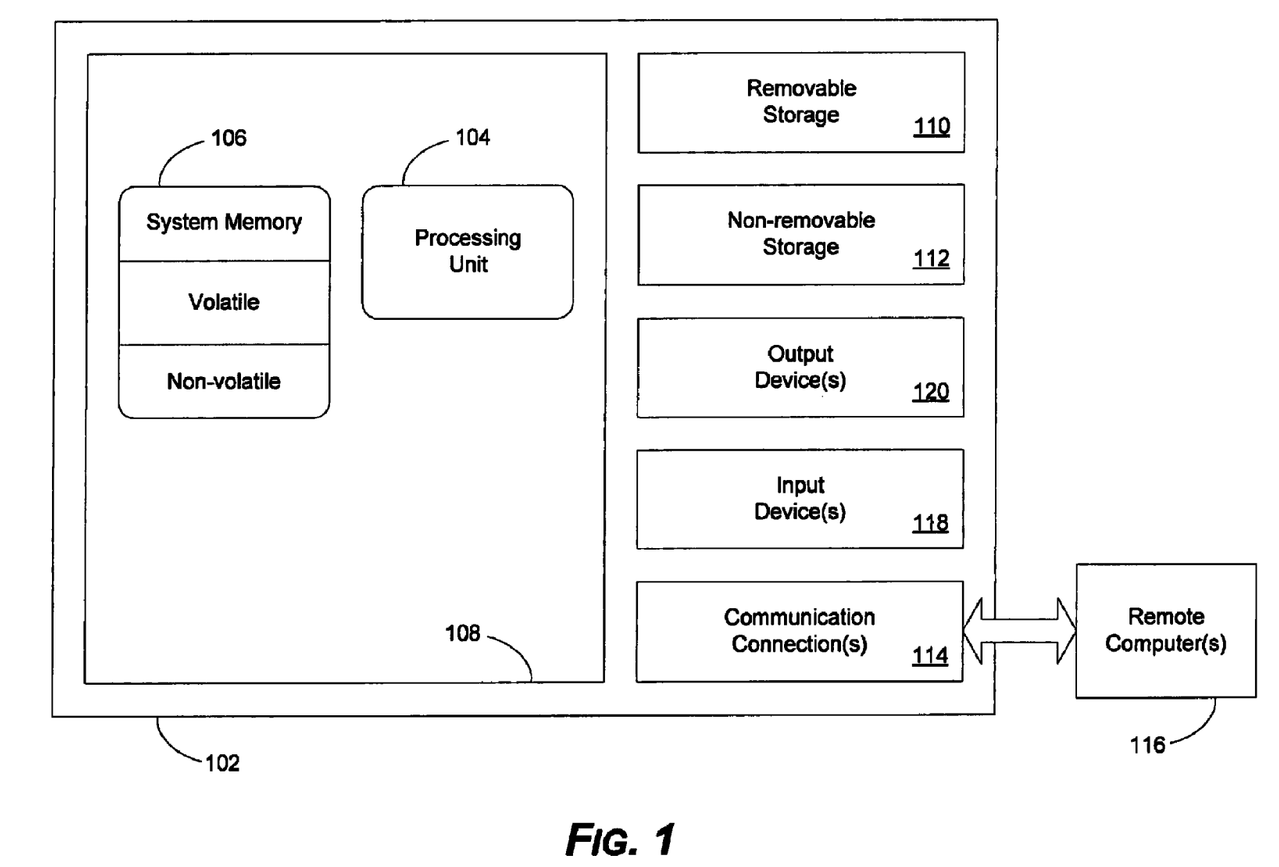
FIG. 1 is a schematic diagram generally illustrating an exemplary computer system usable to implement an embodiment of the invention.

Referring to FIG. 1, an example of a basic configuration for the computer 102 on which aspects of the invention described herein may be implemented is shown. In its most basic configuration, the computer 102 typically includes at least one processing unit 104 and memory 106. The processing unit 104 executes instructions to carry out tasks in accordance with various embodiments of the invention. In carrying out such tasks, the processing unit 104 may transmit electronic signals to other parts of the computer 102 and to devices outside of the computer 102 to cause some result. Depending on the exact configuration and type of the computer 102, the memory 106 may be volatile (such as RAM), non-volatile (such as ROM or flash memory) or some combination of the two. This most basic configuration is illustrated in FIG. 1 by dashed line 108.

The computer 102 may also have additional features/functionality. For example, computer 102 may also include additional storage (removable 110 and/or non-removable 112) including, but not limited to, magnetic or optical disks or tape. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 102. Any such computer storage media may be part of computer 102.

The computer 102 preferably also contains communications connections 114 that allow the device to communicate with other devices such as remote computer(s) 116. A communication connection is an example of a communication medium. Communication media typically embody computer readable instructions, data structures, program modules or other data in a modulated data signal such as a carrier wave or other transport mechanism and includes any information delivery media. By way of example, and not limitation, the term "communication media" includes wireless media such as acoustic, RF, infrared and other wireless media. The term "computer-readable medium" as used herein includes both computer storage media and communication media.

The computer 102 may also have input devices 118 such as a keyboard/keypad, mouse, pen, voice input device, touch input device, etc. Output devices 120 such as a display, speakers, a printer, etc. may also be included. All these devices are well known in the art and need not be described at length here.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
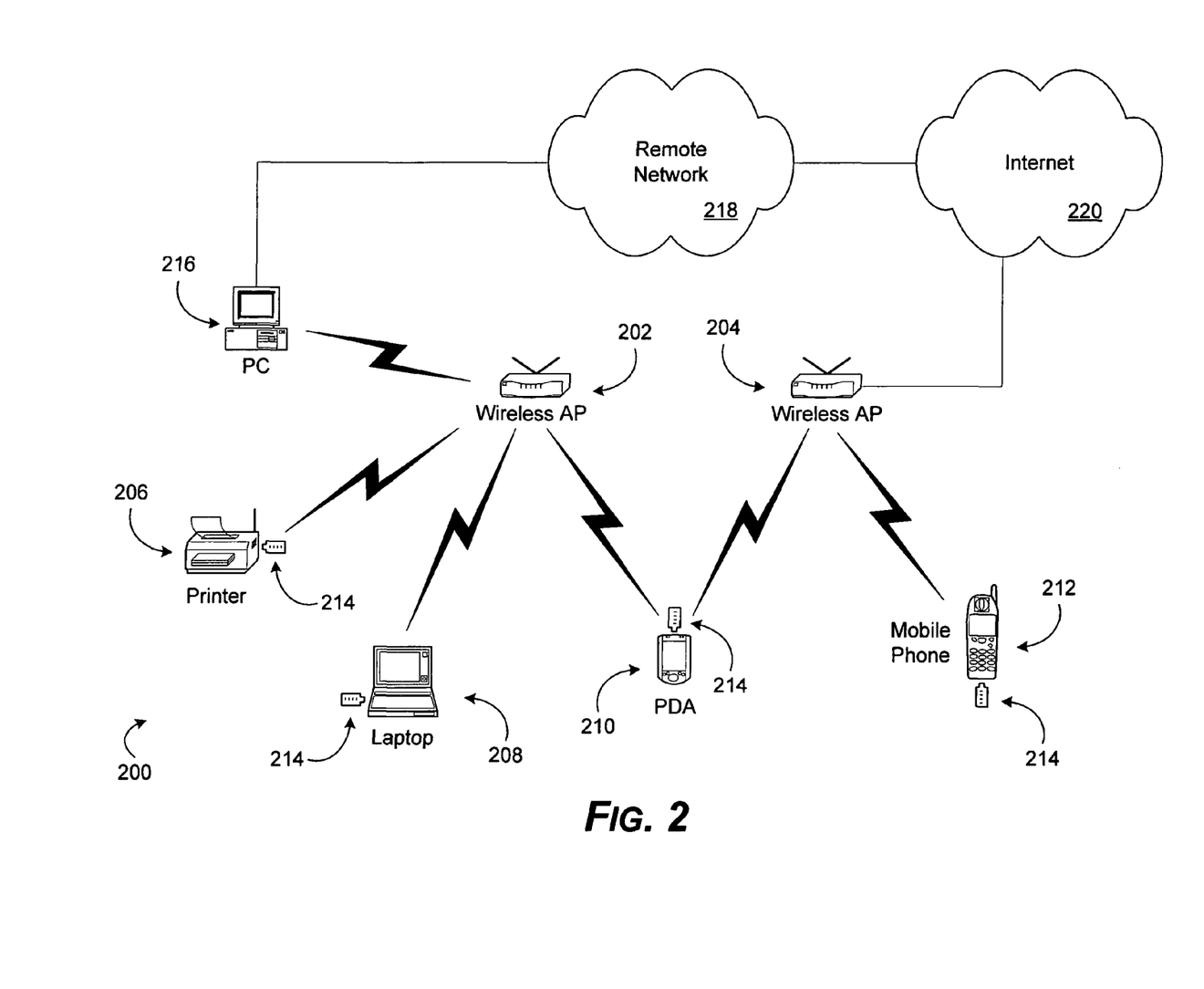
FIG. 2 is a schematic diagram depicting an example networking environment suitable for incorporating aspects of the invention.

FIG. 2 depicts example details of a networking environment 200 suitable for incorporating aspects of the invention. The networking environment 200 includes a first wireless network access point (AP) 202 associated with a first wireless network and a second wireless network access point 204 associated with a second wireless network. For example, the first and second wireless networks may utilize wireless local area network (WLAN) technologies in compliance with standards such as the Institute of Electrical and Electronic Engineers (IEEE) 802.1x series of standards or wireless personal area network (WPAN) technologies in compliance with standards such as the Bluetooth (BT) series of standards or the like. In this example, each of a printer 206, a laptop computer (laptop) 208, a personal digital assistant (PDA) 210 and a mobile phone (212) has access to one or more of the wireless networks through a secure network provisioning device 214. Each secure network provisioning device 214 communicates with one or more of the wireless access points 202 and 204 to provide access to the wireless networks.

In this example, a personal computer (PC) 216 includes a wireless network access mechanism (e.g., a wireless network interface card or NIC) independent of the secure network provisioning devices 214 that enables the personal computer 216 to participate in the first wireless network. The personal computer 216 also includes a second network access mechanism enabling the personal computer 216 to access a remote network 218. Each of the remote network 218 and the second wireless access point 204 provide access to an internet 220 (i.e., a plurality of interconnected networks up to and including "the Internet"). The personal computer 216 may act as a gateway from the first wireless network to the remote network 218. Although paths exist to the internet 220 from both the first and second wireless networks, internet access from the first wireless network passes through the remote network 218 which may provide additional security (e.g., firewalling and virus scanning) so that the quality of service provided by the two paths may be different.

As described above, conventional configuration of computing devices such as the printer 206, the laptop 208, the PDA 210 and the mobile phone 212 for secure network access can be cumbersome and error prone. In an embodiment of the invention, configuration of such devices is not required, instead the secure network provisioning device 214 is appropriately configured and then the secure network provisioning device 214 acts as a gateway between the device 206, 208, 210 and 214 and the secure network or networks, i.e., the wireless networks associated with the first and second wireless access points 202 and 204 in this example. In an embodiment of the invention, the secure network provisioning devices 214 are configured with data corresponding to secure network profiles including network access credentials by the personal computer 216 or other suitable network security authority agent. Example details and context with respect to security authorities and their agents are described by the *Authentication* section of the *Microsoft® Windows® Platform Software Development Kit (SDK)* in the *Microsoft Developer Network (MSDN®) Library* dated June, 2004. Once configured, the secure network provisioning devices 214 switch modes to become a secure network gateway.

Although FIG. 2 depicts secure network provisioning devices 214 as being physically separate from client devices 206, 208, 210 and 212, as will be apparent to one of skill in the art, the secure network provisioning devices 214 may retain substantial utility while being modularly incorporated into the client devices 206, 208, 210, 212 and like computing devices.

Figure 3:
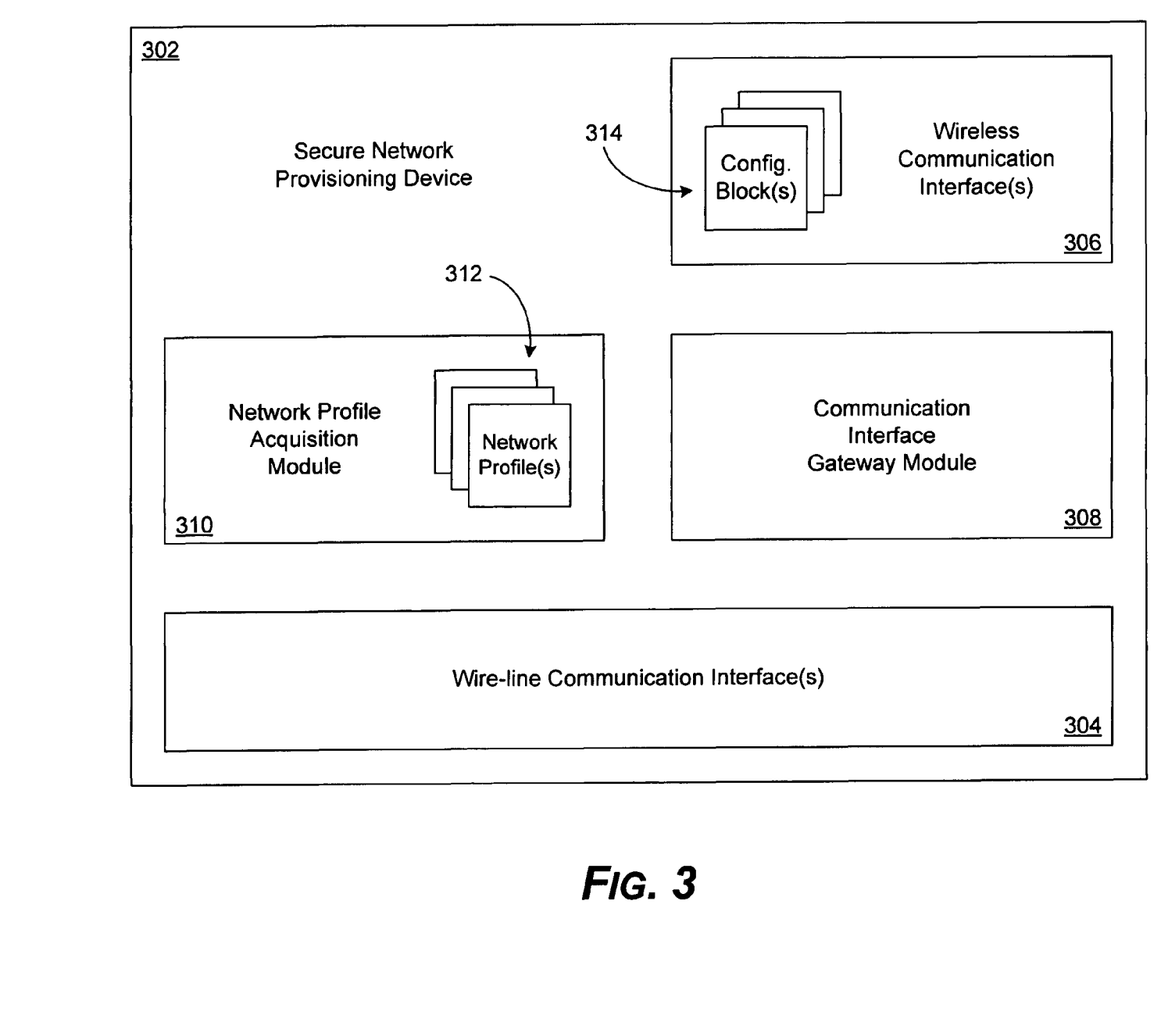
FIG. 3 is a schematic diagram depicting an example secure network provisioning device architecture in accordance with an embodiment of the invention.

Before describing the operation of the secure network provisioning devices 214 in more detail, it will be helpful to describe an example architecture for the secure network provisioning devices 214. FIG. 3 depicts an example architecture suitable for implementing secure network provisioning devices in accordance with an embodiment of the invention. In the example architecture, a secure network provisioning device 302 includes one or more wire-line communication interfaces 304, one or more wireless communication interfaces 306, a communication interface gateway module 308 and a network profile acquisition module 310.

The wire-line communication interfaces 304 may include universal serial bus (USB) interfaces, Ethernet interfaces (e.g., a standard NE2000 Ethernet interface or other communication interface in compliance with the IEEE 802.3x series of standards), and any suitable wire-line communication interface (e.g., communication interfaces to communication media incorporating metallic or nonmetallic wires). The wireless communication interfaces 306 may include communication interfaces in compliance with the IEEE 802.1x series of standards (e.g., Wi-Fi), communication interfaces in compliance with the Bluetooth (BT) series of standards, ultra-wideband (UWB) wireless communication interfaces, wireless USB communication interfaces, and any suitable wireless communication interface (e.g., communication interfaces to communication media independent of metallic or nonmetallic wires).

The network profile acquisition module 310 may acquire one or more network profiles 312 from a network security authority agent such as the personal computer 216 of FIG. 2 over one of the wire-line communication interfaces 304. The network profile acquisition module 310 may provide one or more configuration blocks 314 for the wireless communication interfaces 306. In an embodiment of the invention, each of the wireless communication interfaces 306 is associated with one or more configuration blocks 314. When the configuration blocks 314 associated with a particular wireless communication interface have been provided, the wireless communication interface may communicate over an associated wireless network. In an embodiment of the invention, associated configuration blocks 314 are required before the wireless communication interface may communicate securely over an associated wireless network.

Data in the configuration blocks 314 correspond to one or more attributes of the network profiles 312. One or more of the configuration blocks 314 may be identical to an associated one of the network profiles 312. Details of the contents of the configuration blocks 314 are known in the art and need not be described at length here. Such details are, in large part, set forth by one or more standards documents associated with the network interface to be configured, for example, the IEEE standards documents referenced above.

Once the network profile acquisition module 310 has provided the configuration blocks 314 to the wireless communication interfaces 306, the network profile acquisition module 310 is disabled and the communication interface gateway module 308 is enabled. The communication interface gateway module 308 acts as a bridge/router for communication traffic between the wire-line communication interfaces 304 and the configured wireless communication interfaces 306. Such gateway modules are known in the art and need not be further described here.

Although in this example the network profile acquisition module 310 utilizes one of the wire-line communication interfaces 304 to acquire network profiles that are then utilized to configure one or more of the wireless communication interfaces 306, embodiments of the invention are not so limited. For example, both sets of communication interfaces 304 and 306 may be wireless communication interfaces or both may be wire-line communication interfaces, or the communication interface over which the network profile acquisition module 310 may be a wireless communication interface and the communication interface that it configures may be a wire-line communication interface.

Figure 4:
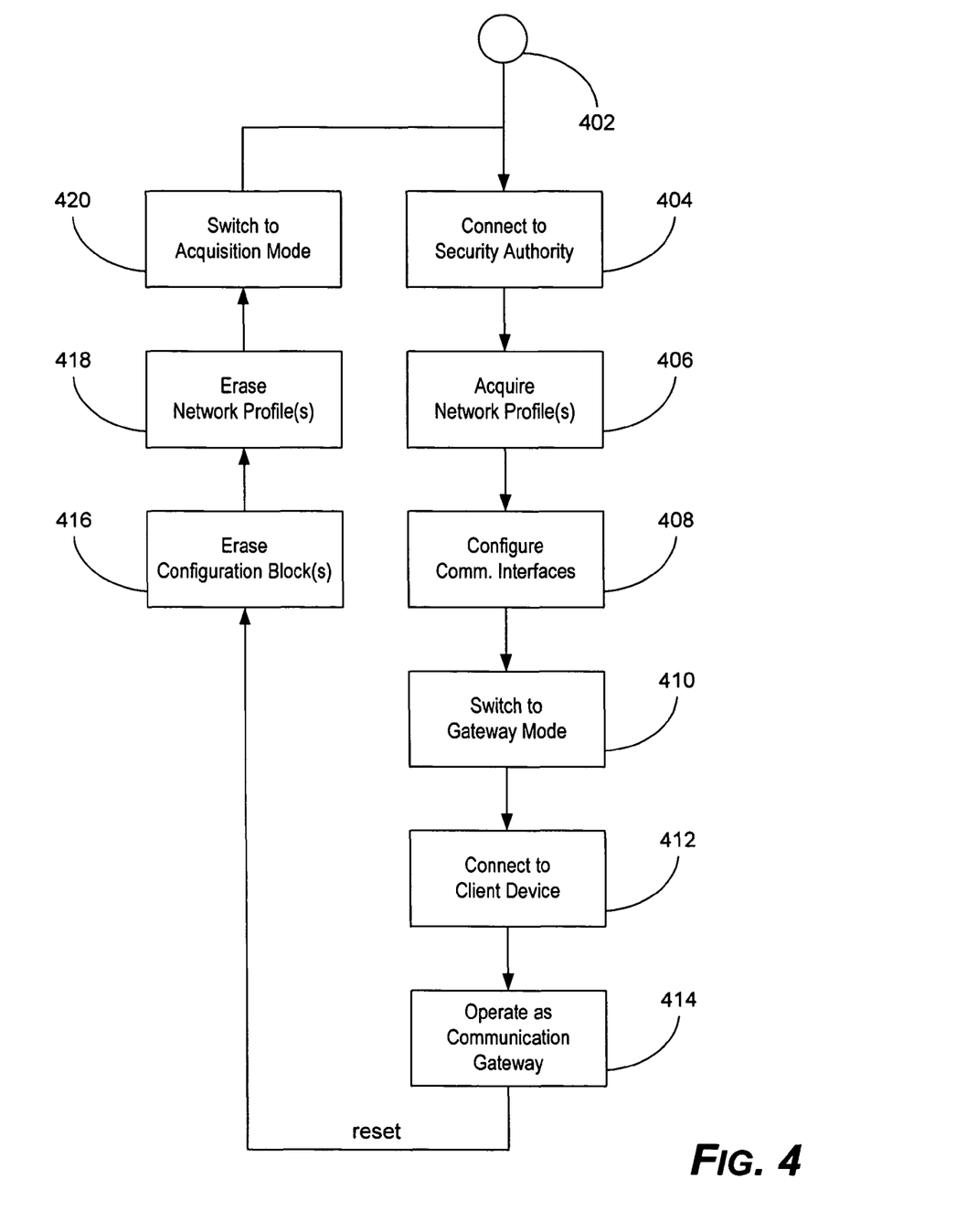
FIG. 4 is a flowchart depicting example steps for providing secure network access with the secure network with the secure network provisioning device in accordance with an embodiment of the invention.
Figure 5:
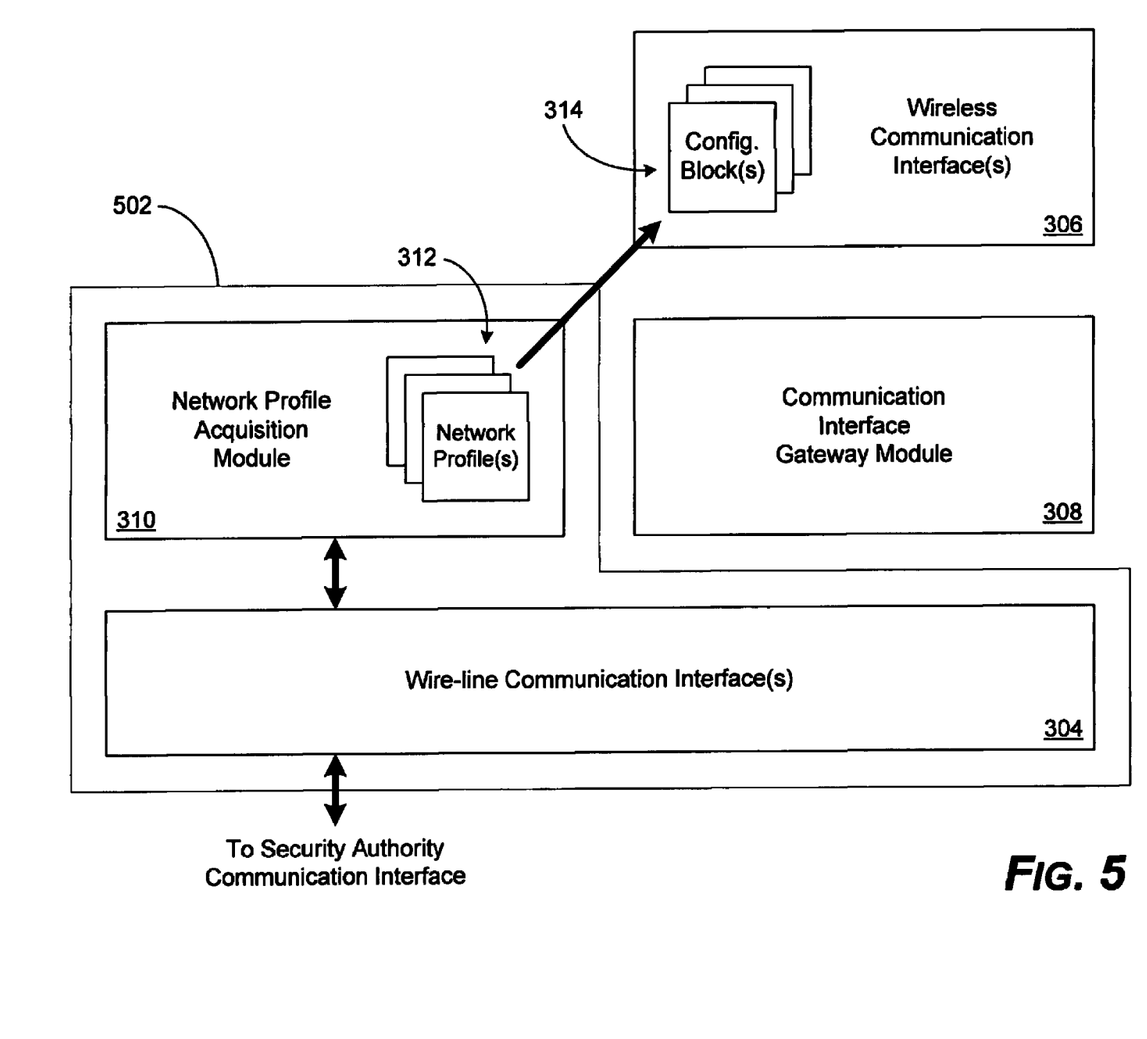
FIG. 5 is a schematic diagram depicting the secure network provisioning device in an acquisition mode in accordance with an embodiment of the invention.

FIG. 4 depicts example steps that may be performed to provide secure network access with the secure network provisioning device 214 (FIG. 2) in accordance with an embodiment of the invention. In its initial state 402, the secure network provisioning device 214 may be in an acquisition mode. FIG. 5 depicts components of the secure network provisioning device 302 (FIG. 3) that may be active in the acquisition mode with dashed line 502. In the acquisition mode, the wireless communication interfaces 306 and the communication interface gateway module 308 are inactive; the wire-line communication interfaces 304 and the network profile acquisition module 310 are active.

At step 404, the secure network provisioning device 214 (FIG. 2) is connected to a security authority (or security authority agent such as the personal computer 216) with the wire-line communication interface 304 (FIG. 5). Upon connection to the security authority, the secure network provisioning device 214 is recognized as a secure network provisioning device with conventional plug-and-play (PnP) techniques. Connecting to the security authority with the wire-line communication interface 304 typically requires physical contact with the security authority or a cable connected to the security authority. In an embodiment of the invention, requiring physical contact of the network provisioning device 214 with the security authority is an element of secure network access authentication.

At step 406, having been recognized by the security authority, the secure network provisioning device 214 acquires one or more network profiles 312 from the security authority. In an embodiment of the invention, the particular network profiles that are acquired from the security authority are be determined by a network profile acquisition protocol. Aspects of steps 404 and 406, including an example network profile negotiation protocol, are described below in more detail with reference to FIG. 7.

At step 408, one or more wireless communication interfaces 306 (FIG. 5) are provided with configuration blocks 314 by the network profile acquisition module 310. Providing a particular wireless communication interface 306 with associated communication blocks 314 may active the wireless communication interface 306, or the wireless communication interface 306 may require explicit activation, for example, at step 410.

Figure 6:
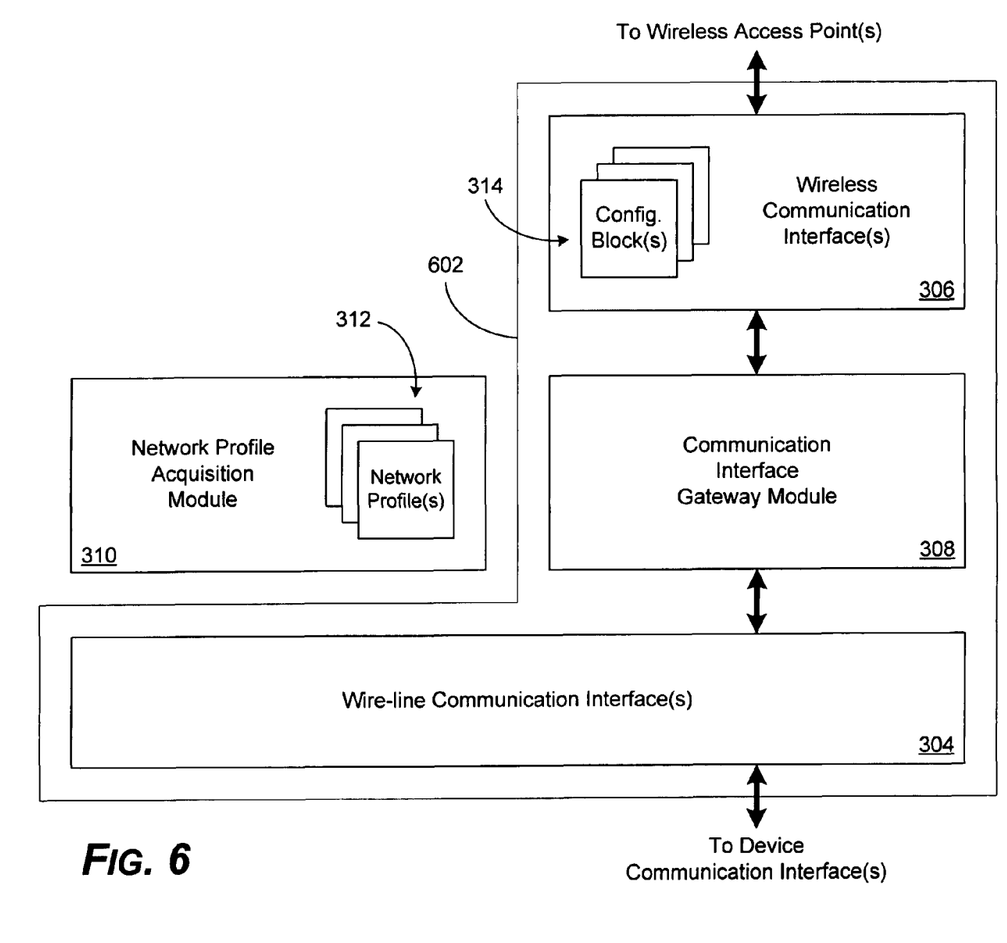
FIG. 6 is a schematic diagram depicting the secure network provisioning device in a gateway mode in accordance with an embodiment of the invention.

At step 410, the secure network provisioning device 214 (FIG. 2) switches to a gateway mode. FIG. 6 depicts components of the secure network provisioning device 302 (FIG. 3) that may be active in the gateway mode with dashed line 602. In the gateway mode, the network profile acquisition module 310 is inactive; the wire-line communication interfaces 304, the wireless communication interfaces 306 and the communication interface gateway module 308 are active.

At step 412, the secure network provisioning device 214 (FIG. 2) is connected to a client device, e.g., client devices 206, 208, 210 or 212. After the switch to gateway mode, in an embodiment of the invention, even if the secure network provisioning device 214 is connected to the client 206, 208, 210 or 212 device with, for example, the same wire-line communication connection with which it was connected to the security authority, the secure network provisioning device 214 no longer presents itself as a secure network provisioning device requiring configuration. Instead, the secure network provisioning device 214 presents itself to the client device 206, 208, 210 or 212 as, for example, a standard wire-line communication interface such as USB or Ethernet. That is, in gateway mode, the secure network provisioning device 214 may simulate a direct, for example, USB or Ethernet wire-line connection to the security authority or security authority agent such as the personal computer 216, or other suitable secure network access point.

Again, connecting the secure network provisioning device 214 (FIG. 2) to the client device 206, 208, 210 or 212 typically requires that the secure network provisioning device 214 be in physical contact with the client device 206, 208, 210 or 212 (e.g., inserted into a client device USB or Ethernet port) or at least close proximity (e.g., in the case of an infrared-based communications interface), and in an embodiment of the invention, this is an element of secure network access authentication. In the visitor-with-a-laptop scenario, the configured (i.e., post-acquisition mode) secure network provisioning device 214 may be simply handed to the visitor for insertion into a USB port of the laptop.

Once the secure network provisioning device 214 in gateway mode (FIG. 2) is recognized by the client device 206, 208, 210 or 212 as a standard wire-line communication interface, the client device 206, 208, 210 or 212 has access to the one or more secure networks acquired by the secure network provisioning device 214 during the acquisition mode. Communication traffic to and from the client device 206, 208, 210 and 212 is gated (e.g., bridged, routed, proxied and/or filtered) to and from the wireless access points 202 and 204 by the communication interface gateway module 308 (FIG. 6).

Significantly, the client device 206, 208, 210 or 212 does not gain access to the network profiles 312 (FIG. 3) or the configuration blocks 314 of the secure network provisioning device 214. As a result, once the secure network provisioning device 214 is removed from the client device 206, 208, 210 or 212, access to the one or more associated secure networks is also removed. That is, the secure network provisioning device 214 may act as a physical secure network "guest key."

The secure network provisioning device 214 (FIG. 2) continues to operate as a communication gateway at step 414 until it is reset. Reset may be initiated programmatically, however, in an embodiment of the invention, reset is initiated by a physical reset button or switch incorporated into the secure network provisioning device 214. Upon reset, the procedure progresses to step 416.

At step 416, the configuration blocks 314 (FIG. 3) of the secure network provisioning device 214 are erased, disabling the associated wireless communication interfaces 306. At step 418, the network profiles 312 are erased, preventing reactivation of the wireless communication interfaces 306 without reacquisition of one or more network profiles 312 from a security authority or security authority agent such as the personal computer 216 (FIG. 2). At step 420, the secure network provisioning device 214 returns to acquisition mode and waits to be connected to the security authority. Without the reset, the secure network provisioning device 214 would present to the security authority as a standard wire-line communication interface, that is, as if the security authority a client device requiring secure network access. After reset, in acquisition mode, the secure network provisioning device 214 presents to the security authority as a security network provisioning device ready to be associated with (i.e., to acquire) one or more network profiles.

Figure 7:
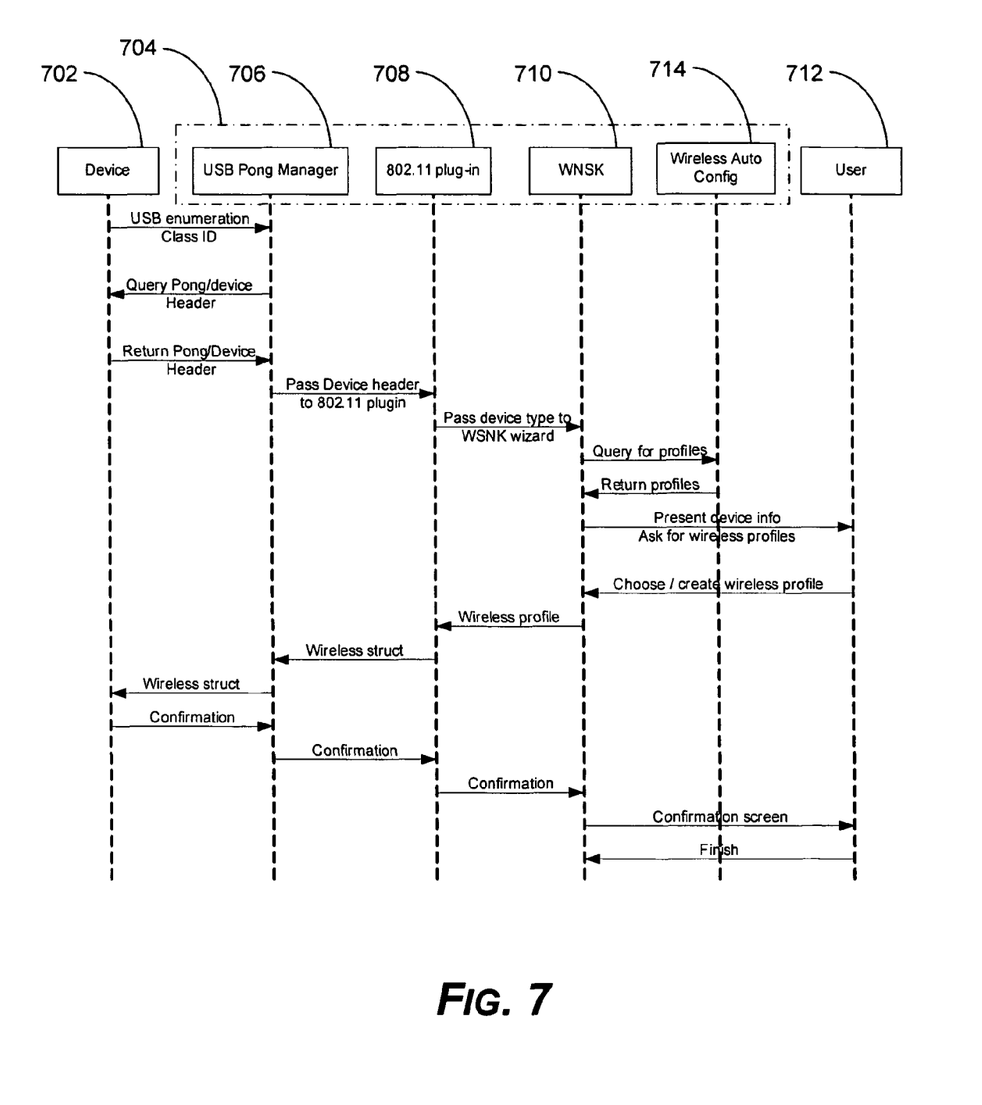
FIG. 7 is a protocol diagram depicting an example network profile acquisition protocol in accordance with an embodiment of the invention.

FIG. 7 depicts an example network profile acquisition protocol suitable for incorporation into steps 404 and 406 of the procedure described above with reference to FIG. 4. Each arrow between dashed lines in FIG. 7 represents a protocol message sent between modules. An order for the protocol messages may be determined by reading the diagram from top to bottom.

When the secure network provisioning device 702 connects to the security authority 704, by universal serial bus in this example, the secure network provisioning device 702 sends a message including universal serial bus (USB) enumeration class identifier (ID) that identifies the secure network provisioning device 702 as a secure network provisioning device ready to acquire network profiles. In this example, the USB enumeration class ID is received by a universal serial bus (USB) PONG Manager 706 of the security authority 704, for example, as part of the standard USB new device enumeration when the secure network provisioning device 702 is inserted in a USB port of the security authority. The USB PONG Manager 706 arbitrates between network profiles and network types, expanding the applicability of particular network profiles by intelligently associating each network profile with a variety of network types. Only some of the features of the USB PONG Manager 706 are described here. Additional details and context may be found in co-pending U.S. patent application Ser. No. 10/645,008, entitled "PHYSICAL DEVICE BONDING", filed on Aug. 21, 2003.

The USB enumeration class ID may be specific to the secure network provisioning device, or even to particular versions thereof. Alternatively, the secure network provisioning device may enumerate as a standard device class such as a USB Flash Drive. If the secure network provisioning device 702 is modularly incorporated into a client device, the secure network provisioning device 702 and the client device may enumerate as a USB composite device, with separate enumeration class identifiers for the secure network provisioning device and the client device even though they share a single USB communication interface. In response to the USB enumeration class ID message, the USB PONG manager 706 sends a query pong/device header message to the secure network provisioning device 702 requesting information regarding the types of networks with which the secure network provisioning device 702 is able to communicate. In response to the query pong/device header message, the secure network provisioning device 702 sends a return pong/device header message including the requested information.

In this example, the USB PONG Manager 706 determines that the secure network provisioning device 702 is able to communicate with wireless networks in compliance with the IEEE 802.11 series of standards. As a result the USB PONG Manager 706 relays the pong/device header message sent by the secure network provisioning device 702 to a PONG 802.11 plug-in module 708. Had the information returned by the secure network provisioning device been different, the USB PONG Manager 706 may have selected a different plug-in module to which to relay the pong/device header message.

The PONG 802.11 plug-in module parses the pong/device header message and invokes a Wireless Network (WSNK) Wizard 710 to query the secure network provisioning device user 712 for the wireless network or networks with which the secure network provisioning device 702 is to be associated. The invocation of the Wireless Network Wizard 710 includes an indication of the device type that caused the invocation, in this case the secure network provisioning device 702, enabling the Wireless Network Wizard 710 to optimize (e.g., minimize) a number of questions and answers required of the user 712. The Wireless Network Wizard 710 first queries a Wireless Auto-Configuration Module 714 for a list of known wireless network profiles and then presents the list in a graphical format to the user 712. An example graphical user interface suitable for incorporation in an embodiment of the invention is described in more detail below with reference to FIG. 8.

The user 712 selects one or more of the known wireless network profiles (or creates a new one) and the Wireless Network Wizard 710 passes the choice back to the PONG 802.11 plug-in module 708 that invoked it. In this example, the PONG 802.11 plug-in module 708 parses the selected wireless network profile to create a wireless network configuration data structure (e.g., wireless network interface configuration block) specifically for the secure network provisioning device type. For example, the wireless network configuration data structure may include a service set identifier (SSID) for the wireless network, a connection type indicator (e.g., extended service set "ESS" or independent basic service set "IBSS"), an authentication type indicator (e.g., "OPEN" or Wi-Fi Protected Access with Pre-shared Key "WPAPSK"), an encryption type indicator (e.g., Wireless Encryption Protocol "WEP" or Temporal Key Integrity Protocol "TKIP"), and a network key (e.g., a 40/104 bit WEP key or a 256 bit WAPPSK key in ASCII or HEX).

The PONG 802.11 plug-in module 708 then sends the wireless network configuration data structure in a message to the USB PONG Manager 706 which, in turn, passes the data structure to the secure network provisioning device 702. Successful receipt of the message containing the wireless network configuration data structure is confirmed with a confirmation message to the USB PONG Manager 706 which triggers a series of confirmation messages terminating at the user 712.

The security authority 704 may track which secure network provisioning devices have been configured with particular network profiles and, in some network types, network access associated with particular secure network provisioning devices may be revoked by the security authority 704, for example, to guard against unauthorized network access with stolen secure network provisioning devices. The security authority 704 may enforce additional network access levels, for example, requiring additional approval for users already connected utilizing a secure network provisioning device to access particular network resources. In addition, the security authority 704 may provide connectivity diagnostic information to assist secure network provisioning device users resolve technical difficulties.

Figure 8:
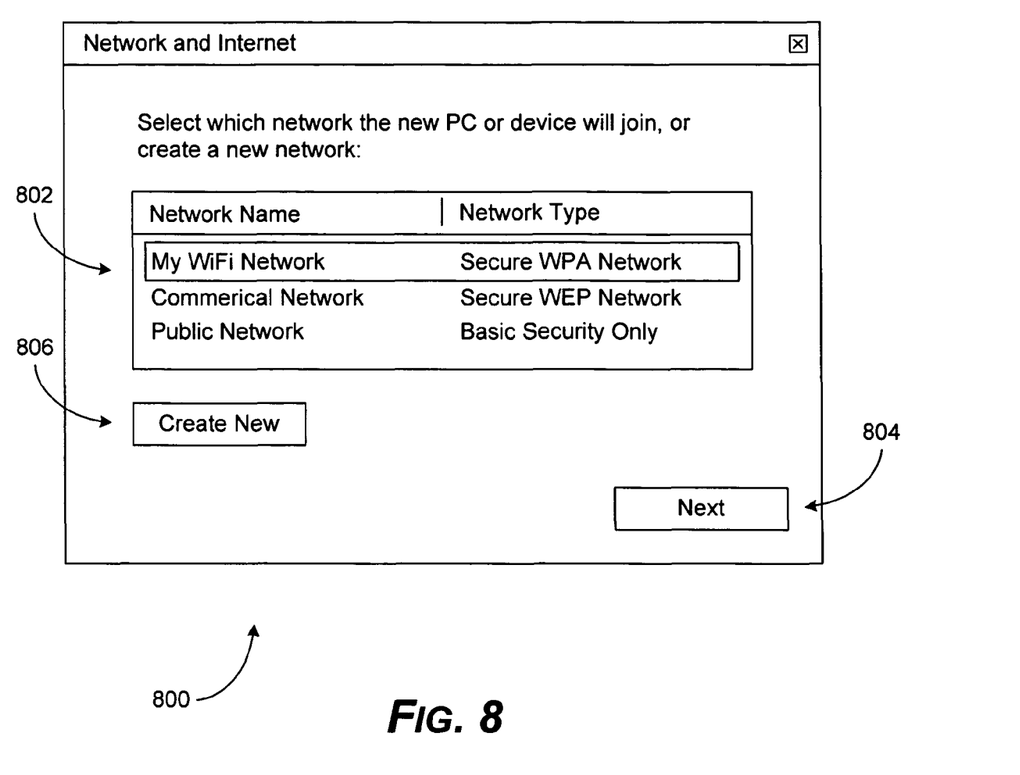
FIG. 8 is schematic diagram illustrating an example graphical user interface element suitable for selecting a secure network profile in accordance with an embodiment of the invention.

FIG. 8 depicts an example graphical user interface element suitable for selecting a secure network profile in accordance with an embodiment of the invention. The deliberately simple user interface 800 prompts the secure network provisioning device user to select a wireless network to which the secure network provisioning device will provide access. The example list select area 802 includes a "friendly name" for each wireless network, as well as an indication of a type of the wireless network, in particular a level of security associated with each network. The user may select a wireless network and then select a next button 804, or the user may first select the create new button 806 to create and add a new wireless network (and associated wireless network profile) to the select area 802.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented method of providing secure network access, comprising:
    connecting, via a first interface, a secure network provisioning device to a security authority;
    acquiring, by the secure network provisioning device operating in an acquisition mode, at least one network profile from the security authority;
    configuring at least a second interface of the secure network provisioning device with data corresponding to attributes of said at least one network profile;
    switching the secure network provisioning device from the acquisition mode to a gateway mode, in which gateway mode the secure network provisioning device functions as a gateway;
    connecting, via the first interface, the secure network provisioning device to a client device, the first interface having been disconnected from the security authority; and
    for each of said at least one network profile, providing the client device, while in the gateway mode, with access through at least the second interface to a secure network associated with the network profile,
    wherein disconnection of the first interface of the secure network provisioning device from the client device terminates access to the secure network by the client device.

2. The method of claim 1, further comprising, in response to a reset command:
    erasing said at least one network profile from the secure network provisioning device; and
    switching the secure network provisioning device from the gateway mode to the acquisition mode.

3. The method of claim 1, wherein one of said at least a second interface is a wireless network interface.

4. The method of claim 1, wherein connecting the secure network provisioning device to the security authority requires physical proximity of the secure network provisioning device and the security authority.

5. The method of claim 1, wherein connecting the secure network provisioning device to the client device requires physical proximity of the secure network provisioning device and the client device.

6. The method of claim 1, wherein the first interface is a secure network provisioning device is connected to the security authority through a network interface independent of said at least one network interface.

7. The method of claim 6, wherein the first interface is a wire-line network interface.

8. The method of claim 6, wherein the secure network provisioning device presents as a plurality of computing devices, the plurality of devices comprising:
    a secure network provisioning device ready to acquire network profiles when in the acquisition mode; and
    a standard network interface when in the gateway mode.

9. The method of claim 8, wherein the first interface is a universal serial bus (USB) interface and presenting as a plurality of devices comprises enumerating different universal serial bus (USB) enumeration class identifiers in different modes.

10. A computer storage medium having thereon computer-executable instructions for providing secure network access to a client device through a secure network provisioning device, the instructions operable to perform a method comprising:
    managing at least one network profile associated with a secure network;
    accepting a connection from the secure network provisioning device in an acquisition mode, the connection over a first interface of the secure network provisioning device, the secure network provisioning device having a plurality of operating modes including the acquisition mode and a gateway mode; and
    providing over the first interface said at least one network profile to the secure network provisioning device, each network profile enabling the secure network provisioning device to provide the client device with access to the secure network associated with the network profile by functioning as a gateway between the client device, connected via the first interface, and the secure network, connected via a second interface, when the secure network provisioning device switches to the gateway mode and the first interface of the secure network provisioning device is disconnected from the computer storage medium and connected to the client device.

11. The computer storage medium of claim 10, wherein providing said at least one network profile to the secure network provisioning device comprises engaging in a network profile acquisition protocol with the secure network provisioning device.

12. The computer storage medium of claim 11, wherein the secure network provisioning device switches from acquisition mode to gateway mode upon completion of the network profile acquisition protocol.

13. The computer storage medium of claim 10, wherein access to each secure network requires valid authentication credentials.

14. The computer storage medium of claim 10, wherein managing said at least one network profile comprises, for each network profile, at least one of creating, reading and updating the network profile.

15. The computer storage medium of claim 10, further comprising recognizing the secure network provisioning device with plug-and-play (PnP).

16. The computer storage medium of claim 10, wherein accepting the connection from the secure network provisioning device requires physical proximity of the secure network provisioning device and the computer-readable medium.

17. The computer storage medium of claim 10, wherein providing the client device with access to the secure network requires physical proximity of the secure network provisioning device and the client device.

18. The computer storage medium of claim 10, wherein the first interface is a wire-line network interface.

19. The computer storage medium of claim 10, wherein the secure network provisioning device is capable of presenting as a plurality of computing devices, the plurality of devices comprising:

a secure network provisioning device ready to acquire network profiles when in the acquisition mode; and a standard network interface when in the gateway mode.

20. The computer storage medium of claim 19, wherein the first interface is a universal serial bus (USB) interface and presenting as the plurality of devices comprises enumerating different universal serial bus (USB) enumeration class identifiers in different modes.

* * * * *